US011170002B2

(12) United States Patent
Hanckel et al.

(10) Patent No.: US 11,170,002 B2
(45) Date of Patent: Nov. 9, 2021

(54) INTEGRATING KAFKA DATA-IN-MOTION WITH DATA-AT-REST TABLES

(71) Applicant: Oracle International Corporation, Redwood Shores, CA (US)

(72) Inventors: Robert Hanckel, Amherst, NH (US); Manjari D. Yalavarthy, Nashua, NH (US); Rongzheng Yan, Nashua, NH (US); Chen Cao, Braintree, MA (US)

(73) Assignee: Oracle International Corporation, Redwood Shores (CA)

( * ) Notice: Subject to any disclaimer, the term of this patent is extended or adjusted under 35 U.S.C. 154(b) by 111 days.

(21) Appl. No.: 16/593,966

(22) Filed: Oct. 4, 2019

(65) Prior Publication Data

US 2020/0125572 A1 Apr. 23, 2020

Related U.S. Application Data

(60) Provisional application No. 62/747,742, filed on Oct. 19, 2018.

(51) Int. Cl.
*G06F 16/2455* (2019.01)
*G06F 16/242* (2019.01)
(Continued)

(52) U.S. Cl.
CPC ...... *G06F 16/24568* (2019.01); *G06F 16/221* (2019.01); *G06F 16/248* (2019.01);
(Continued)

(58) Field of Classification Search
CPC .......... G06F 16/24568; G06F 16/2423; G06F 16/248; G06F 16/258; G06F 16/221; G06F 16/2456; G06F 16/25
See application file for complete search history.

(56) References Cited

U.S. PATENT DOCUMENTS 5,095,421 A 3/1992 Freund
5,241,675 A 8/1993 Sheth et al.
(Continued)

FOREIGN PATENT DOCUMENTS

CN 102999519 A 3/2013
CN 103177055 A 6/2013
(Continued)

OTHER PUBLICATIONS

Macnicol, U.S. Appl. No. 15/331,599, filed Oct. 21, 2016, Notice of Allowance, dated Feb. 5, 2020.
(Continued)

*Primary Examiner* — Dangelino N Gortayo
(74) *Attorney, Agent, or Firm* — Hickman Becker Bingham Ledesma LLP; Brian N. Miller

(57) ABSTRACT

Techniques are described herein for analyzing data streams in conjunction with relational database data in a DBMS. A database dictionary defines one or more columns for an external table and a data source for said external table that comprises an external message stream. Executing a query that targets the external table includes generating one or more rows from the external table, each row corresponding to a message in the external message stream that was retrieved from the external message stream after a message stream offset.

23 Claims, 6 Drawing Sheets

(51) Int. Cl.
*G06F 16/248* (2019.01)
*G06F 16/25* (2019.01)
*G06F 16/22* (2019.01)

(52) U.S. Cl.
CPC ...... *G06F 16/2423* (2019.01); *G06F 16/2456* (2019.01); *G06F 16/258* (2019.01)

(56) References Cited

U.S. PATENT DOCUMENTS

| | | | |
|---|---|---|---|
| 5,263,156 A | 11/1993 | Bowen et al. | |
| 5,287,496 A | 2/1994 | Chen et al. | |
| 5,332,265 A | 7/1994 | Orimo et al. | |
| 5,333,316 A | 7/1994 | Champagne et al. | |
| 5,355,477 A | 10/1994 | Strickland et al. | |
| 5,369,757 A | 11/1994 | Spiro et al. | |
| 5,388,196 A | 2/1995 | Pajak et al. | |
| 5,423,037 A | 6/1995 | Hvasshovd | |
| 5,454,102 A | 9/1995 | Tang et al. | |
| 5,487,164 A | 1/1996 | Kirchhofer et al. | |
| 5,499,382 A | 3/1996 | Nusinov | |
| 5,506,979 A | 4/1996 | Menon | |
| 5,553,279 A | 9/1996 | Goldring | |
| 5,555,404 A | 9/1996 | Torbjoslashedrnsen et al. | |
| 5,559,991 A | 9/1996 | Kanfi | |
| 5,566,315 A | 10/1996 | Mililo et al. | |
| 5,574,906 A | 11/1996 | Morris | |
| 5,581,753 A | 12/1996 | Terry et al. | |
| 5,603,024 A | 2/1997 | Goldring | |
| 5,613,113 A | 3/1997 | Goldring | |
| 5,806,076 A | 9/1998 | Ngai et al. | |
| 5,870,743 A | 2/1999 | Cohen | |
| 5,870,758 A | 2/1999 | Bamford et al. | |
| 5,870,761 A | 2/1999 | Demers et al. | |
| 5,924,096 A | 7/1999 | Draper et al. | |
| 5,951,695 A | 9/1999 | Kolovson | |
| 5,956,731 A | 9/1999 | Bamford et al. | |
| 5,974,427 A | 10/1999 | Reiter | |
| 5,983,277 A | 11/1999 | Heile et al. | |
| 5,991,771 A | 11/1999 | Falls et al. | |
| 6,014,669 A | 1/2000 | Slaughter et al. | |
| 6,044,367 A | 3/2000 | Wolff | |
| 6,122,630 A | 9/2000 | Strickler et al. | |
| 6,192,377 B1 | 2/2001 | Ganesh et al. | |
| 6,282,039 B1 | 8/2001 | Bartlett | |
| 6,298,319 B1 | 10/2001 | Heile et al. | |
| 6,353,835 B1 | 3/2002 | Lieuwen | |
| 6,370,622 B1 | 4/2002 | Chiou et al. | |
| 6,393,485 B1 | 5/2002 | Chao et al. | |
| 6,496,830 B1 | 12/2002 | Jenkins | |
| 6,516,327 B1 | 2/2003 | Zondervan et al. | |
| 6,574,717 B1 | 6/2003 | Ngai et al. | |
| 6,611,898 B1 | 8/2003 | Slattery et al. | |
| 6,691,139 B2 | 2/2004 | Ganesh et al. | |
| 6,839,751 B1 | 1/2005 | Dietz et al. | |
| 6,886,084 B2 | 4/2005 | Kawashima et al. | |
| 7,024,656 B1 | 4/2006 | Ahad | |
| 7,076,508 B2 | 7/2006 | Brourbonnais et al. | |
| 7,082,435 B1 | 7/2006 | Guzman | |
| 7,136,970 B2 | 11/2006 | Yoshiya et al. | |
| 7,222,136 B1 | 5/2007 | Brown et al. | |
| 7,228,354 B2 | 6/2007 | Chambliss et al. | |
| 7,237,027 B1 | 6/2007 | Raccah et al. | |
| 7,287,034 B2 | 10/2007 | Wong et al. | |
| 7,290,017 B1 | 10/2007 | Wang et al. | |
| 7,370,068 B1 | 5/2008 | Pham et al. | |
| 7,464,113 B1 | 12/2008 | Girkar et al. | |
| 7,548,898 B1 | 6/2009 | Tarenskeen et al. | |
| 7,558,290 B1 | 7/2009 | Nucci | |
| 7,570,451 B2 | 8/2009 | Bedillion et al. | |
| 7,627,612 B2 | 12/2009 | Ahal et al. | |
| 7,634,637 B1 | 12/2009 | Lindholm | |
| 7,644,014 B2 | 1/2010 | Viswanath | |
| 7,644,084 B2 | 1/2010 | Rapp | |
| 7,761,425 B1 | 7/2010 | Erickson et al. | |
| 7,877,400 B1 | 1/2011 | Matthew | |
| 7,895,216 B2 | 2/2011 | Longshaw et al. | |
| 7,912,051 B1 | 3/2011 | Rowlands et al. | |
| 7,941,520 B1 | 5/2011 | Kite | |
| 7,966,293 B1 | 6/2011 | Owara et al. | |
| 8,578,261 B1 | 11/2013 | Gupta | |
| 8,645,337 B2 | 2/2014 | Kapoor et al. | |
| 9,251,210 B2 | 2/2016 | Chaudhry et al. | |
| 9,916,352 B2 | 3/2018 | Chaudhry et al. | |
| 10,534,770 B2 * | 1/2020 | Chen | G06F 16/2456 |
| 2001/0000536 A1 | 4/2001 | Tarin | |
| 2002/0038384 A1 | 3/2002 | Khan | |
| 2002/0133508 A1 | 9/2002 | Larue et al. | |
| 2002/0135585 A1 | 9/2002 | Dye | |
| 2002/0165724 A1 | 11/2002 | Bartus | |
| 2003/0028509 A1 | 2/2003 | Sah | |
| 2003/0088537 A1 | 5/2003 | Ko | |
| 2003/0105928 A1 | 6/2003 | Ash | |
| 2003/0135495 A1 | 7/2003 | Vagnozzi | |
| 2003/0217236 A1 | 11/2003 | Rowlands | |
| 2004/0073754 A1 | 4/2004 | Cypher | |
| 2004/0122910 A1 | 6/2004 | Douglass et al. | |
| 2004/0193574 A1 | 9/2004 | Suzuki | |
| 2004/0199552 A1 | 10/2004 | Ward et al. | |
| 2005/0044089 A1 | 2/2005 | Wu | |
| 2006/0004691 A1 | 1/2006 | Sifry | |
| 2006/0010130 A1 | 1/2006 | Leff et al. | |
| 2006/0212481 A1 | 9/2006 | Stacey et al. | |
| 2006/0224551 A1 | 10/2006 | Lariba-Pey | |
| 2007/0038689 A1 | 2/2007 | Shinkai | |
| 2007/0061485 A1 | 3/2007 | Horton | |
| 2007/0061544 A1 | 3/2007 | Uppala | |
| 2007/0083505 A1 | 4/2007 | Ferrari et al. | |
| 2007/0156957 A1 | 7/2007 | MacHardy et al. | |
| 2007/0198608 A1 | 8/2007 | Prahlad | |
| 2007/0226277 A1 | 9/2007 | Holenstein et al. | |
| 2007/0239680 A1 | 10/2007 | Oztekin et al. | |
| 2007/0255748 A1 | 11/2007 | Ferragina | |
| 2008/0065596 A1 | 3/2008 | Shadmon | |
| 2008/0098044 A1 | 4/2008 | Todd | |
| 2008/0155303 A1 | 6/2008 | Toeroe | |
| 2008/0209009 A1 | 8/2008 | Katwala et al. | |
| 2008/0215580 A1 | 9/2008 | Altinel et al. | |
| 2008/0219575 A1 | 9/2008 | Wittenstein | |
| 2008/0222136 A1 | 9/2008 | Yates | |
| 2008/0222159 A1 | 9/2008 | Aranha et al. | |
| 2008/0222311 A1 | 9/2008 | Lee et al. | |
| 2008/0222111 A1 | 12/2008 | Hoang et al. | |
| 2009/0024384 A1 | 1/2009 | Kobayashi et al. | |
| 2009/0307241 A1 | 1/2009 | Schimunek et al. | |
| 2009/0037512 A1 | 2/2009 | Barsness | |
| 2009/0063538 A1 | 3/2009 | Chitrapura | |
| 2009/0138944 A1 | 5/2009 | Rajasekaran | |
| 2009/0171679 A1 | 7/2009 | Salgado et al. | |
| 2009/0235230 A1 | 9/2009 | Lucas | |
| 2009/0254532 A1 | 10/2009 | Yang | |
| 2009/0276479 A1 | 11/2009 | Lucas | |
| 2009/0287737 A1 | 11/2009 | Hammerly | |
| 2010/0036843 A1 | 2/2010 | MacNaughton et al. | |
| 2010/0042587 A1 | 2/2010 | Johnson | |
| 2010/0088309 A1 | 4/2010 | Petculescu | |
| 2010/0145909 A1 | 6/2010 | Ngo | |
| 2010/0211577 A1 | 8/2010 | Shimizu et al. | |
| 2010/0250549 A1 | 9/2010 | Muller et al. | |
| 2010/0278446 A1 | 11/2010 | Ganesh | |
| 2010/0306234 A1 | 12/2010 | Wang et al. | |
| 2010/0325169 A1 | 12/2010 | Loh | |
| 2010/0325352 A1 | 12/2010 | Schuette et al. | |
| 2010/0332654 A1 | 12/2010 | Bose | |
| 2011/0029569 A1 | 2/2011 | Ganesh et al. | |
| 2011/0035369 A1 | 2/2011 | Halasipuram | |
| 2011/0047330 A1 | 2/2011 | Potapov | |
| 2011/0066605 A1 | 3/2011 | Elbaz | |
| 2011/0066791 A1 | 3/2011 | Goyal et al. | |
| 2011/0072217 A1 | 3/2011 | Hoang et al. | |
| 2011/0087637 A1 | 4/2011 | Sundaram et al. | |
| 2011/0099179 A1 | 4/2011 | Balebail | |
| 2011/0113036 A1 | 5/2011 | Idicula et al. | |
| 2011/0138123 A1 | 6/2011 | Aditya et al. | |
| 2012/0013758 A1 | 1/2012 | Frederiksen | |

(56) References Cited

U.S. PATENT DOCUMENTS

| | | |
|---|---|---|
| 2012/0030428 A1 | 2/2012 | Yasufuku |
| 2012/0036133 A1 | 2/2012 | Chen et al. |
| 2012/0054225 A1 | 3/2012 | Marwah |
| 2012/0054533 A1 | 3/2012 | Shi et al. |
| 2012/0063533 A1 | 3/2012 | Fonseka |
| 2012/0084287 A1 | 4/2012 | Lakshminarayan |
| 2012/0117064 A1 | 5/2012 | Draese |
| 2012/0159099 A1 | 6/2012 | Lindamood |
| 2012/0173515 A1 | 7/2012 | Jeong et al. |
| 2012/0221788 A1 | 8/2012 | Raghunathan |
| 2012/0296883 A1 | 11/2012 | Ganesh |
| 2012/0323849 A1 | 12/2012 | Garin et al. |
| 2012/0323947 A1 | 12/2012 | Bice |
| 2013/0024433 A1 | 1/2013 | Amit |
| 2013/0103654 A1 | 4/2013 | McLachlan |
| 2013/0132674 A1 | 5/2013 | Sundrani |
| 2013/0132684 A1 | 5/2013 | Ostrovsky |
| 2013/0132705 A1 | 5/2013 | Ishii |
| 2013/0151491 A1 | 6/2013 | Gislason |
| 2013/0166534 A1 | 6/2013 | Yoon |
| 2013/0166553 A1 | 6/2013 | Yoon |
| 2013/0232176 A1 | 9/2013 | Plattner |
| 2014/0032615 A1 | 1/2014 | Hammerschmidt et al. |
| 2014/0067792 A1 | 3/2014 | Erdogan |
| 2014/0075493 A1 | 3/2014 | Krishnan et al. |
| 2014/0122452 A1 | 5/2014 | Faerber |
| 2014/0214754 A1 | 7/2014 | Li |
| 2015/0019559 A1 | 1/2015 | Maquaire |
| 2015/0088813 A1 | 3/2015 | Lahiri et al. |
| 2015/0088830 A1 | 3/2015 | Kamp |
| 2015/0088919 A1 | 3/2015 | Hunter |
| 2015/0089134 A1 | 3/2015 | Mukherjee et al. |
| 2015/0178305 A1 | 6/2015 | Mueller |
| 2015/0254257 A1 | 9/2015 | Kritchko |
| 2015/0324373 A1 | 11/2015 | Tyercha |
| 2015/0356158 A1 | 12/2015 | Potapov et al. |
| 2016/0077750 A1 | 3/2016 | Erdmann |
| 2016/0085781 A1 | 3/2016 | Ellison |
| 2016/0085834 A1 | 3/2016 | Gleeson et al. |
| 2016/0140137 A1 | 5/2016 | Konik |
| 2016/0147833 A1 | 5/2016 | Chaudhry et al. |
| 2016/0196530 A1 | 7/2016 | Staffin |
| 2016/0224660 A1 | 8/2016 | Munk |
| 2016/0294651 A1 | 10/2016 | Renna |
| 2017/0017683 A1 | 1/2017 | Fourny et al. |
| 2017/0024435 A1 | 1/2017 | Kociubes et al. |
| 2017/0060912 A1 | 3/2017 | Liu |
| 2017/0109406 A1 | 4/2017 | Chavan |
| 2017/0116136 A1 | 4/2017 | Macnicol |
| 2017/0286475 A1* | 10/2017 | Cadarette ............ G06F 16/2365 |
| 2018/0011893 A1 | 1/2018 | Kimura |
| 2018/0089276 A1* | 3/2018 | Victor ................... G06F 16/258 |
| 2018/0150371 A1* | 5/2018 | Gintis ................. G06F 11/1004 |
| 2019/0065246 A1* | 2/2019 | Senapaty .............. G06F 9/5088 |
| 2019/0102412 A1 | 4/2019 | Macnicol et al. |
| 2019/0384835 A1* | 12/2019 | Luo ..................... G06F 16/1865 |
| 2019/0391897 A1* | 12/2019 | Vijendra ................ G06N 20/00 |

FOREIGN PATENT DOCUMENTS

| | | |
|---|---|---|
| EP | 0 501 180 A | 9/1992 |
| GB | 2 505 185 A | 2/2014 |
| WO | WO 03/107222 A1 | 12/2003 |
| WO | WO 2015/041967 A1 | 3/2015 |
| WO | WO 2015/069941 | 5/2015 |

OTHER PUBLICATIONS

Oracle, "Oracle Database In-Memory", dated Aug. 2014, 29 pages.

U.S. Appl. No. 15/331,559, filed Oct. 21, 2016, Final Office Action, dated Oct. 3, 2019.

Potapov, U.S. Appl. No. 14/733,691, filed Jun. 8, 2015, Final Office Action, dated Nov. 18, 2019.

Chavan, U.S. Appl. No. 15/294,460, filed Oct. 14, 2016, Final Office Action, dated Oct. 21, 2019.

Oracle Database Administrator's Guide, 10g Release 2 (10.2), Chapter 24, May 2006, 34 pages. http://download.oracle.com/docs/cd/B19306_01/server.102/b14231.pdf.

Amazon, "Database Developer Guide", dated Dec. 1, 2012, 2 pages.

Anonymous: "Oracle Database In-Memory: Powering the Real-Time Enterprise", dated Dec. 31, 2014, 9 pages.

Begley et al. "MCJoin: A Memory-constrained Join for Column-Store Main-memory Databases", dated 2012, ACM SIGMOD International Conference on Management of Data (SIGMOD '12), pp. 121-132.

Bernet, "Dictionary Compression for a Scan-Based, Main-Memory Database System", dated 2010, 89 pages.

Bober, Paul M., et al., "On Mixing Queries and Transactions via Multiversion Locking", Computer Sciences Department, University of Wisconsin, 1992, pp. 535-545.

Bornhovd et al., "Adaptive Database Caching with DBCache", IEEE 2004, pp. 11-18.

Candillier et al., "Mining XML Documents In: Data Mining Patterns: New Methods and Applications", dated Nov. 19, 2007, IGI Global, 28 pages.

IBM, "A Scheduling Algorithm for Processing Mutually Exclusive Workloads in a Multi-System Configuration", dated Aug. 19, 2002, IEEE, 3 pages.

KD Nuggets, "Apache Arrow and Apache Parquet: Why We Needed Different Projects for Columnar Data, On Disk and In-Memory", www.kdnuggets.com/2017/02/apache-arrow-parquet-columnar-data, Feb. 2017, 8pgs.

Loizos, M., et al., "Improving distributed join efficiency with extended bloom filter operations", Advanced Networking and Applications, 2007. AINA '07., 21st international Conf. IEEE, May 1, 2007.

Abello et al., "Data Warehousing, Handbook of Massive Datasets", dated Apr. 1, 2002, Springer, 4 pages.

Mohan, C., et al., "Efficient and Flexible Methods for Transient Versioning of Records to Avoid Locking by Read-Only Transactions",Almaden Research Center, date Feb. 6, 1992, pp. 124-133.

Zhang Ho et al., "In-Memory Big Data Management and Processing: A Survery", IEEE Transactions on Knowledge and Data Engineering, vol. 27, No. 7, dated Jul. 31, 2015, 30 pages.

Oracle Database Administrator's Guide, 11g Release 2 (11.2), Chapter 26, Feb. 2010, 54 pages. http://download.oracle.com/docs/cd/E11882_01/server.112/e10595.pdf.

Oracle® Clusterware, Administration and Deployment Guide, 11g Release 1(11.1), B28255-06, Oct. 2008. http://download.oracle.com/docs/cd/B28359_01/rac.111/b28255.pdf, 186 pages.

Phipps, Colin:, "Mapping Deflated Files", Internet Article, dated Jan. 6, 2013, http://zsync.moria.org.uk/paper/ch03s02.html, 3 pages.

Roth et al., "Don't Scrap It Wrap it!, A Wrapper Architecture for Legacy Data Sources", Proceedings of the International Conference on Very Largedata Bases, dated Aug. 26, 1997, 10 pages.

Schaffner et al., "A Hybrid Row-Column OLTP Database Architecture for Operational Reporting" Business Intelleigence for the Real-Time Enterprise: Second International Workshop, dated Aug. 24, 2008, 14 pgs.

The Times Ten Team, Mid-Tier Caching: The Times Ten Approach, Jun. 2002. ACM SIGMOD, 6 pages.

Vishal Sikka et al., "Efficient Transaction Processing in SAP Hana Database", Proceedings of the 2012, International Conference on Management of Data, dated Janaury 31, 2012, 12 pages.

Wikipedia, the free encyclopedia, "Apache Avro", https://en.wikipedia.org/wiki/Apache_Avro, last viewed on Dec. 28, 2015, 2 pages.

Wikipedia, the free encyclopedia, "BSON", last viewed on Dec. 28, 2015, https://en.wikipedia.org/wiki/BSON, 3 pages.

Wikipedia, the free encyclopedia, "Protocol Buffers", last viewed on Dec. 28, 2015, https://en.wikipedia.org/wiki/Protocol_Buffers, 3 pages.

Mackert, F. Lothar et al., "R* optimizer validation and performance evaluation for local queries" SIGMOD Record, ACM, New York, NY, US., vol. 15, No. 2, Jun. 1, 1986, pp. 84-95, ISSN: 0163-5808.

(56) References Cited

OTHER PUBLICATIONS

Macnicol, U.S. Appl. No. 15/268,254, filed Sep. 16, 2016, Notice of Allowance, dated Mar. 27, 2018.
Chavan, U.S. Appl. No. 15/294,460, filed Oct. 14, 2016, Office Action, dated Jun. 12, 2019.
Ellison, U.S. Appl. No. 14/955,368, filed Dec. 1, 2015, Notice of Allowance, dated Jan. 3, 2018.
Ellison, U.S. Appl. No. 14/955,368, filed Dec. 1, 2015, Office Action, dated Aug. 7, 2017.
Gleeson, U.S. Appl. No. 14/823,393, filed Aug. 11, 2015, Interview Summary, dated Mar. 14, 2018.
Gleeson, U.S. Appl. No. 14/823,393, filed Aug. 11, 2015, Interview Summary, dated Nov. 8, 2017.
Gleeson, U.S. Appl. No. 14/823,393, filed Aug. 11, 2015, Notice of Allowance, dated Feb. 14, 2018.
Gleeson, U.S. Appl. No. 14/823,393, filed Aug. 11, 2015, Office Action, dated Sep. 8, 2017.
Lahiri, U.S. Appl. No. 14/097,575, filed Dec. 5, 2013, Notice of Allowance, dated Nov. 9, 2018.
Lahiri, U.S. Appl. No. 14/097,575, filed Dec. 5, 2013, Office Action, dated Feb. 20, 2018.
Lahiri, U.S. Appl. No. 14/097,575, filed Dec. 5, 2013, Office Action, dated Apr. 6, 2017.
Liu, U.S. Appl. No. 15/162,235, filed May 23, 2016, Final Office Action, dated Oct. 2, 2018.
Liu, U.S. Appl. No. 15/162,235, filed May 23, 2016, Notice of Allowance, dated Jul. 1, 2019.
Chavan, U.S. Appl. No. 15/294,460, filed Oct. 14, 2016, Interview Summary, dated Jul. 29, 2019.
Lui, U.S. Appl. No. 15/162,235, filed May 23, 2016, Interview Summary, dated Oct. 2, 2018.
U.S. Appl. No. 14/955,368, filed Dec. 1, 2015, Office Action, dated Sep. 23, 2016.
Macnicol, U.S. Appl. No. 15/268,524, filed Sep. 16, 2016, Notice of Allowance, dated Sep. 6, 2018.
Macnicol, U.S. Appl. No. 15/331,599, filed Oct. 21, 2016, Interview Summary, dated Jul. 25, 2019.
Macnicol, U.S. Appl. No. 15/331,599, filed Oct. 21, 2016, Office Action, dated Apr. 19, 2019.
Potapov, U.S. Appl. No. 14/733,691, filed Jun. 8, 2015, Advisory Action, dated Apr. 16, 2019.
Potapov, U.S. Appl. No. 14/733,691, filed Jun. 8, 2015, Final Office Action, dated Dec. 13, 2017.
Potapov, U.S. Appl. No. 14/733,691, filed Jun. 8, 2015, Interview Summary, dated Oct. 27, 2017.
Potapov, U.S. Appl. No. 14/733,691, filed Jun. 8, 2015, Office Action, dated Jul. 5, 2018.
Potapov, U.S. Appl. No. 14/733,691, filed Jun. 8, 2015, Office Action, dated Jul. 28, 2017.
U.S. Appl. No. 14/097,575, filed Dec. 5, 2013, Final Office Action, dated Jul. 14, 2016.
U.S. Appl. No. 14/097,575, filed Dec. 5, 2013, Office Action, dated Nov. 4, 2015.
U.S. Appl. No. 14/955,368, filed Dec. 1, 2015, Final Office Action, dated Dec. 9, 2016.
Liu, U.S. Appl. No. 15/162,235, filed May 23, 2016, Office Action, dated May 3, 2018.
Macnicol, U.S. Appl. No. 15/331,599, filed Oct. 21, 2016, Intervierw Summary, dated Dec. 17, 2019.
Chavan, U.S. Appl. No. 15/294,460, filed Oct. 14, 2016, Advisory Action, dated Feb. 3, 2020.
Potapov, U.S. Appl. No. 14/733,691, filed Jun. 8, 2020, Notice of Allowance, dated Oct. 20, 2020.

* cited by examiner

INTEGRATING KAFKA DATA-IN-MOTION WITH DATA-AT-REST TABLES

CROSS-REFERENCE TO RELATED APPLICATIONS; BENEFIT CLAIM

This application claims the benefit of Provisional Appln. 62/747,742, filed Oct. 19, 2018, the entire contents of which is hereby incorporated by reference as if fully set forth herein, under 35 U.S.C. § 119(e).

FIELD OF THE DISCLOSURE

Embodiments are related to database systems. More specifically, embodiments are related to integration of data-in-motion with relational databases.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A computing cluster, such as Apache Kafka, may provide a high performance data stream processing platform for online web services and may capture data streams ("data-in-motion") into partitions for managed processing. To decouple analysis from bursts of inbound data or for other batching purposes such as analysis scheduling, messages may be persisted in the computing cluster and retained for a period time. During the retention period, the messages may be consumed by one or more data consumers, such as backend data processing applications.

One application class of data-in-motion is the Internet of Things (IoT). This data may be generated by smart devices embedded in consumer products. Embedded applications may send data to processing agents that reside elsewhere on the Internet for supplementing IoT devices with analytical functionality. IoT devices may include a variety of smart devices in various industries, such as smart locks, smart thermostats, smart security systems, smart health sensors for patients, and the like. IoT devices may be wireless fidelity (WIFI) enabled devices that: a) continually monitor and measure their environment or their own operation to generate telemetry data, and b) stream that telemetry data to online web services dedicated to capturing, analyzing, and reacting to such telemetry data.

For example, each IoT device of a plurality of IoT devices may produce a continuous flow of information. The plurality of IoT devices, in aggregate, create a large volume of data to be processed. Some devices may produce data that is not straightforward to interpret and/or include unit-specific identification information and measurements that need to be correlated with other data. In order to analyze the data, applications may need to interpret the stream of data, and correlate messages with existing data to identify, for example, the type of device that sent the message, device details, and device owner information. That is, for the data streams to be meaningful, the data needs to be correlated with non-stream data such as technical data, device information, and/or customer relationship management (CRM) data. Such non-stream data may reside in relational database systems.

One possible approach for correlating non-stream data with stream data is for the application to query a database to look up device information associated with a device that sent a message. The application may also query a CRM table to identify corresponding customer and customer contact information associated with the device. However, a downside of this approach is that the application issues one or more queries per message processed. If a large number of messages are being processed, the cost of querying the database multiple times per message becomes a substantial processing overhead.

To reduce such lookup traffic, an alternative approach is to export tables from the database into the application space, which may entail caching partial or full copies of tables, either on the operating system where the application is running, or within the application's own virtual address space. The problem with such a caching approach is that a table may be very large and/or may contain volatile information that frequently changes. For coherency, the cached tables might need synchronization with a master copy in the relational database. For example, an optimization may entail moving database table content to be more local to the application. If the application runs on a distributed system in order to scale horizontally, the application would need to cope with the complexities of keeping multiple caches of a table residing on multiple different machines up-to-date and consistent.

The telemetry and stream analytics discussed above are not restricted to the IoT space, but also include other application domains where data in motion needs to be processed. For example, a financial application may process a trading exchange's order book, where the "data in motion" represents posted but pending or unfulfilled requests to buy or sell a given quantity of a commodity at a current market price. The application may process a buy or sell order reflecting a current market price of the commodity that may be stored within a database table. Additionally, the application may need to update the fluctuating market price in the table, based on a recent pattern of buys and sells, to reflect current trends of supply and demand. This creates a feedback loop between data-in-motion and database tables that the data-in-motion implicitly cross reference. The processing and updating of data should be performed both efficiently and within the safety net of a standard database atomic, consistent, isolated, and durable (ACID) transaction. ACID compliant transactions guarantee data validity even in the event of system failures, e.g. application, database, and/or server failures, while processing is being performed.

Thus, techniques for integrating and relating large transactional tables in a database system with non-transactional data streams to provide applications with an efficient processing model without loss of horizontal scalability is desired.

Figure 1:
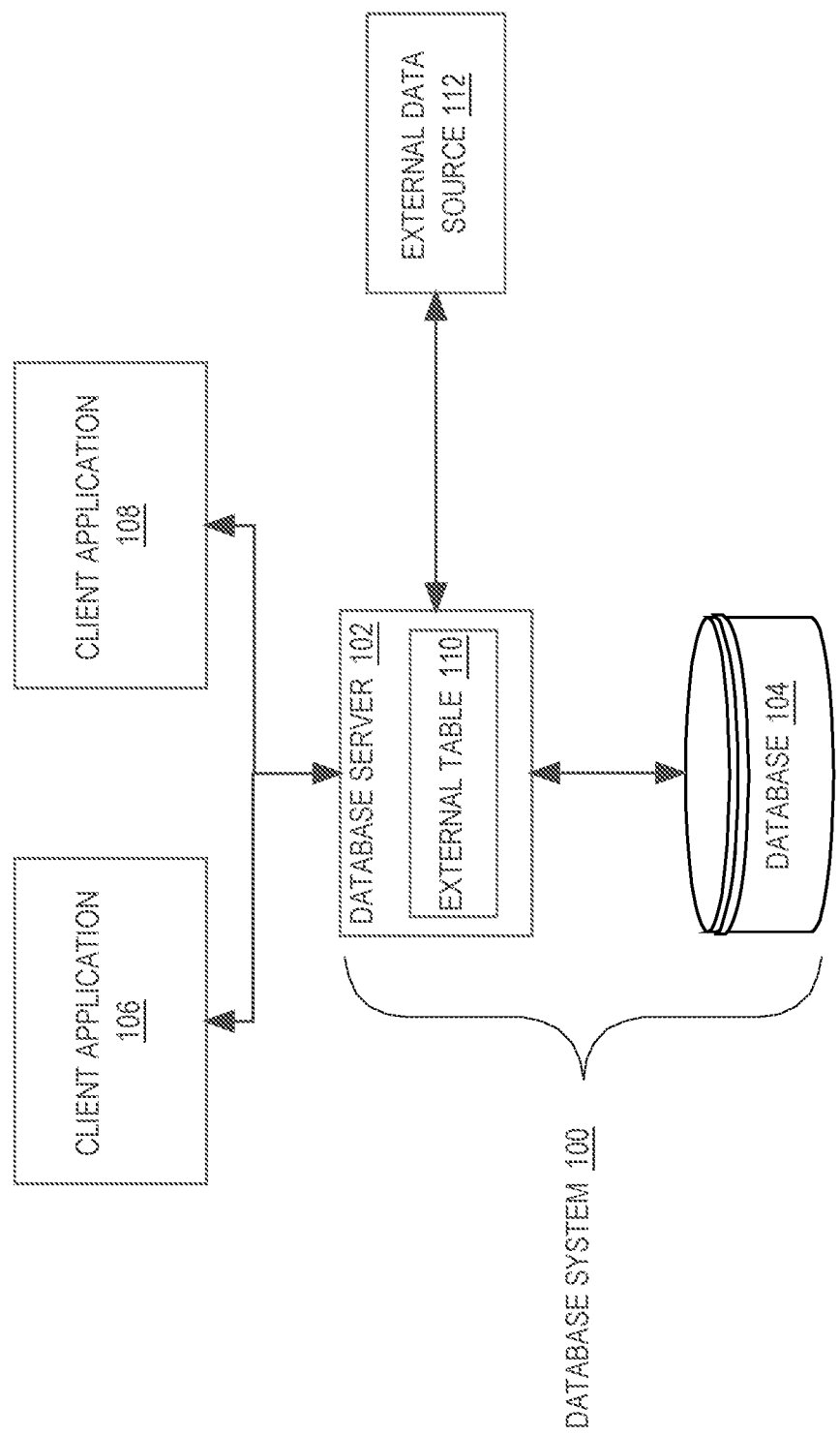
FIG. 1 depicts an example database management system on which embodiments may be implemented.

While each of the drawing figures depicts a particular embodiment for purposes of depicting a clear example, other embodiments may omit, add to, reorder, and/or modify and of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for processing data that is external to a database management system (DBMS) using external tables defined in the DBMS. Specifically, the techniques described herein allow the DBMS to process messages from an external, non-relational message stream.

In an embodiment, an external table is defined in the DBMS, where the data source for the external table includes an external message stream. A message stream offset may indicate a position within the external message stream.

In response to receiving a query, one or more messages are retrieved from the external message stream from the position indicated by the message stream offset. One or more corresponding rows of the external table are generated based on the one or more retrieved messages. Data analysis is performed using the generated rows of the external table.

In an embodiment, the DBMS tracks and stores the message stream offset for the external message stream. The DBMS may update the message stream offset after retrieving the one or more messages, based on the number of messages retrieved. The updated message stream offset may be used to read one or more additional messages for a subsequent query.

These techniques provide a way to apply analytical operations that are supported by a DBMS, such as filtration, joins, aggregation (e.g. group by), sorting, and statistical data analysis, that may not be supported by the external data source. Additionally, the techniques allow the DBMS to, in response to queries or other database statements, operate on data that is stored in a format that may not typically be processed and understood by the DBMS.

System Overview

Referring to FIG. 1, it is a block diagram that depicts a database system 100 according to one embodiment. In FIG. 1, database system 100 includes a database server 102, which represents a combination of software and resources on one or more computing devices, that is communicatively coupled to a database 104.

The database server 102 is configured to accept user commands, such as queries, data definition language (DDL), and data manipulation language (DML) instructions, and carry out the commands using the database 104.

Database client applications 106 and 108 represent a combination of software and resources on one or more computing devices that send commands to the database server 102 in order to retrieve, modify, delete, and/or submit data stored by database 104.

In the embodiment illustrated in FIG. 1, database server 102 is communicatively coupled to an external data source 112. As explained in further detail below, database server 102 may retrieve data from external data source 112, and convert the data into a relational database format using external table 110.

Database server 102 may receive queries or other instructions that target external table 110, and by proxy, the data in external data source 112. Client applications 106 and 108 may send commands to the database server 102 that analyze, process, or otherwise operate on the external data in external table 110.

External Database Table Overview

Database system 100 may define one or more external tables, such as external table 110. An external table is a database table that maps to external data residing outside of the database, such as external data source 112. The external table provides an abstraction for data from a data source that is not formatted in the native storage format of a database management system.

An external table abstracts a table from data residing outside of a database system. For example, external tables using an extract-transform-load (ETL) mechanism can extract data from an external data source in a textual format, and render the extracted data as a relational table that may be accessed in SQL. The external table may reside in volatile memory for speed, on disk for durability, or both. As explained in further detail below, the data source for an external table may be one or more message streams. A set of messages may be extracted from the one or more message streams on behalf of a group of one or more applications, such as client applications 106 and 108.

A database management system may define an external table in response to receiving one or more data definition language (DDL) or other database statement that describes the external table. The database statement may specify one or more columns for the external table and the data source for the external table.

In an embodiment, defining the external table includes defining data source parameters that specify how to retrieve the data from the data source. For example, the parameters may identify one or more modules, functions, or the like, that are configured to read, extract, and/or convert data from the data source. The one or more modules, functions, and etc. may be used to retrieve data from the data source and convert the retrieved data into a format that can be processed or stored by the database.

In an embodiment, in response to receiving the one or more DDL statements, metadata is generated that describes the properties of the external table. These properties include a table name, table columns including the column names and data types of each of the columns, and other parameters specified in the DDL statement. The metadata may be stored in a database dictionary in association with the external table.

After receiving a query that references an external table, a mapping is generated between database table columns and the external data source. The mapping indicates, for a portion of the external data source, a corresponding database table column. For example, assume the external data source stores data with three fields, X, Y, and Z. The mapping may indicate that field X corresponds to a database table column "col_X," field Y corresponds to a database table column "col_Y," and field Z corresponds to a database table column "col_Z."

In an embodiment, generating the mapping may comprise requesting or retrieving metadata associated with the external table, e.g. from the database dictionary. Profile data may be generated based on the associated metadata. The profile data may specify the data source and the one or more modules for retrieving data from the data source. Additionally, the profile data may specify a plurality of data fields or columns contained in the data source, and data types for each data field or column. The mapping may be generated based on the profile data.

In response to receiving a query, work granules may be generated based on the profile data for performing work for the query that involves the external table, such as receiving or retrieving data from the data source, processing the data to conform to the data format of the external table, storing the data in the external table, and/or filtering the data based on the query.

Example methods for generating and using external tables may be found, for example, in U.S. application Ser. No. 14/733,691, "Storage-side Scanning on Non-natively Formatted Data," filed Jun. 8, 2015, the contents of which are incorporated by reference as if fully set forth herein.

Kafka Overview

In an embodiment, the external data source 112 is a computing platform for processing data streams or message streams. An example computing platform for processing data streams is Apache Kafka. Kafka captures data streams in real-time from producer applications as a plurality of messages, retains the messages for a period of time so that they can be consumed by consumer applications, and sends the messages to requesting consumer applications for analysis and other processing. The messages from different producer applications may have different shapes, i.e. format, structure, and data types, and/or different content. Each message may include a message key and a message value. A message key may be used to determine a particular partition to which a message belongs. A message value comprises the contents of the message. Additionally, the message may include metadata such as the topic to which the message belongs, the partition to which the message belongs, an offset of the message, a timestamp at which the message was received, etc.

The messages captured and stored by Kafka may be divided into topics, partitions, and/or groups. A topic is a stream of messages that have the same shape, i.e. format, structure, and data types. A topic may be divided into one or more partitions. Each partition includes a batch of messages that are stored together for bulk processing. The batch of messages may be grouped together based on a time at which they were received, i.e. each partition is a horizontal shard of a topic. Alternately, the messages may be assigned to a partition, for example, based on their respective message key. Additionally, the batch of messages may include replication, e.g. a partition may have distributed replicas for fault tolerance.

Figure 2:
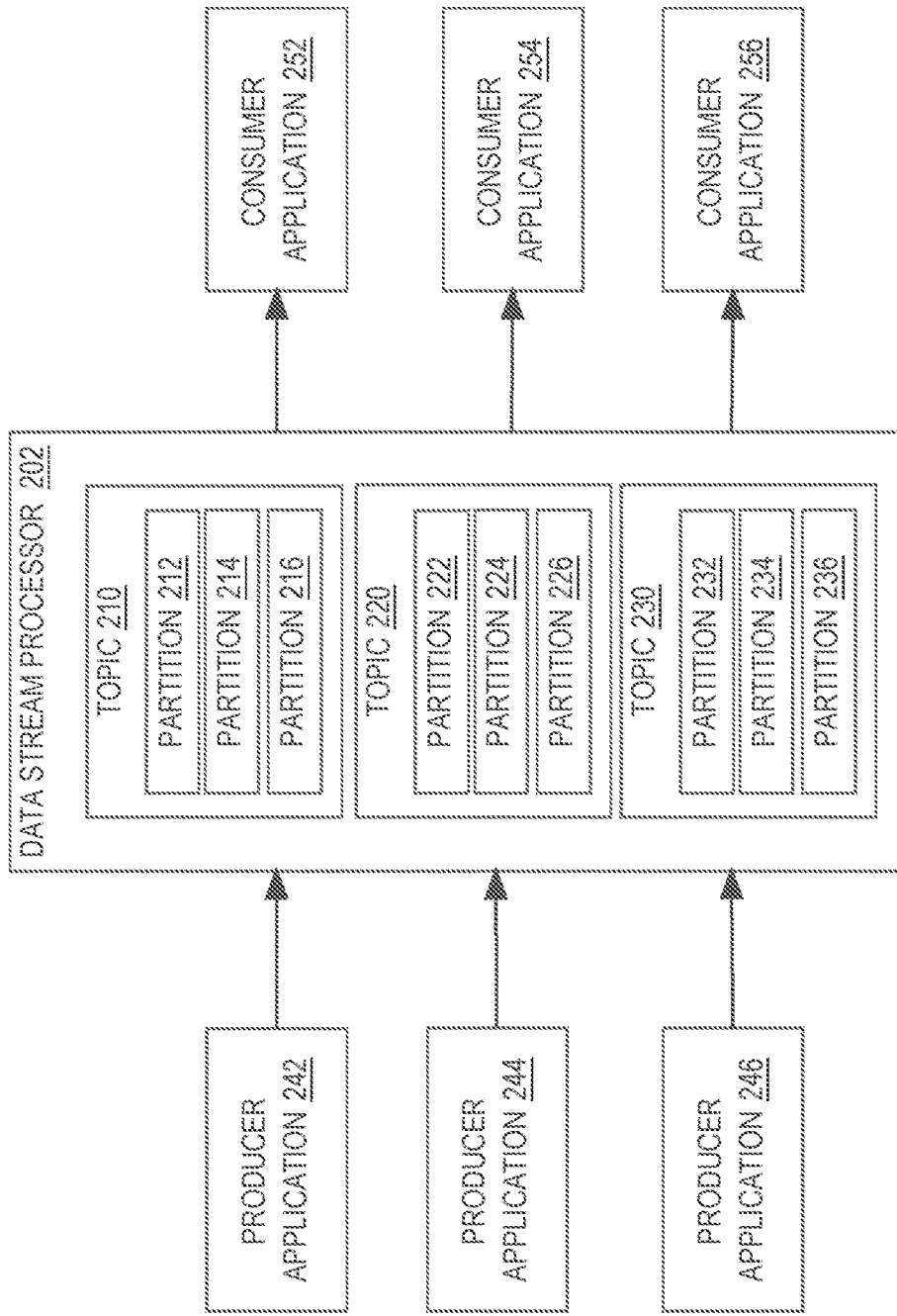
FIG. 2 depicts an example data stream processing system.

FIG. 2 illustrates an example system 200 for processing data streams. In FIG. 2, data stream processor 202 receives messages from producer applications, 242-246, and sends messages to consumer applications 252-256. The messages received from the producer applications are divided into a plurality of topics, such as topic 210-230. Each topic is divided into a plurality of partitions. For example, topic 210 includes partitions 212-214; topic 220 includes partitions 222-226; and topic 230 includes partitions 232-236.

A group is a set of instances of a single application, where each instance is dedicated to reading and processing a single respective partition for the group, in a divide-and-conquer strategy. Each member of a group reads from its own respective partition. The group members may use an application programming interface (API) for Kafka to control how many messages to read at once. Additionally, a partition offset may be used to track which messages in the partition were previously read. Each member of a group may use a respective partition offset to position each read to a new batch of messages. The partition offset indicates a position within the partition, i.e. a particular message within the set of messages in the partition.

Kafka may track and store the highest offset of each partition that it has provided to an application. However, if Kafka manages offsets, the system may be vulnerable to anomalies if a failure occurs during a commit processing window that concludes processing of a partition. An application may lose pending messages that it needed to process or be forced to properly handle messages that it has already processed.

As an example, assume a trading application sends and receives transaction data indicating buys and sells. The trading application may have processed messages from offset value 900 to 1000, but not yet committed the transaction. Kafka may store an offset value of 900 for the trading application. If the Kafka system fails, then the next time the trading application requests data, Kafka may provide transaction data starting from stored offset value 900. Thus, some transactional consistency is needed, which may be difficult to achieve at high stream volume and/or with a large database.

Alternately, each application or application instance may track its own progress by tracking and storing the highest offset it has read and processed for each partition. For example, two applications may consume the same data stream but process partitions at different rates. The two applications may process different partitions at the same time, the same partitions at different times, different amounts of the same partition at the same time, different partitions at different times, etc. Each application may therefore store different offsets for the same partition.

External Database Table with Kafka

One solution for enabling analysis of data streams in conjunction with transactional database data is using external tables whose data sources are data streams. An external table may be defined whose data source is a topic. The external table may map to one or more particular partitions of the topic, and may be configured to retrieve data from the one or more particular partitions of the topic.

As discussed above, messages in a topic share the same shape, i.e. format, structure, and data type(s). In an embodiment, the shape of the messages in the topic may be mapped to columns of the external table. Additionally, the external table may include columns whose values are set by the Kafka system, such as message metadata or other data contained within the key-value payload of the messages. Example system values include partition ID, partition offset, and message timestamp. Each value may be mapped to a respective column in the external table.

Figure 3:
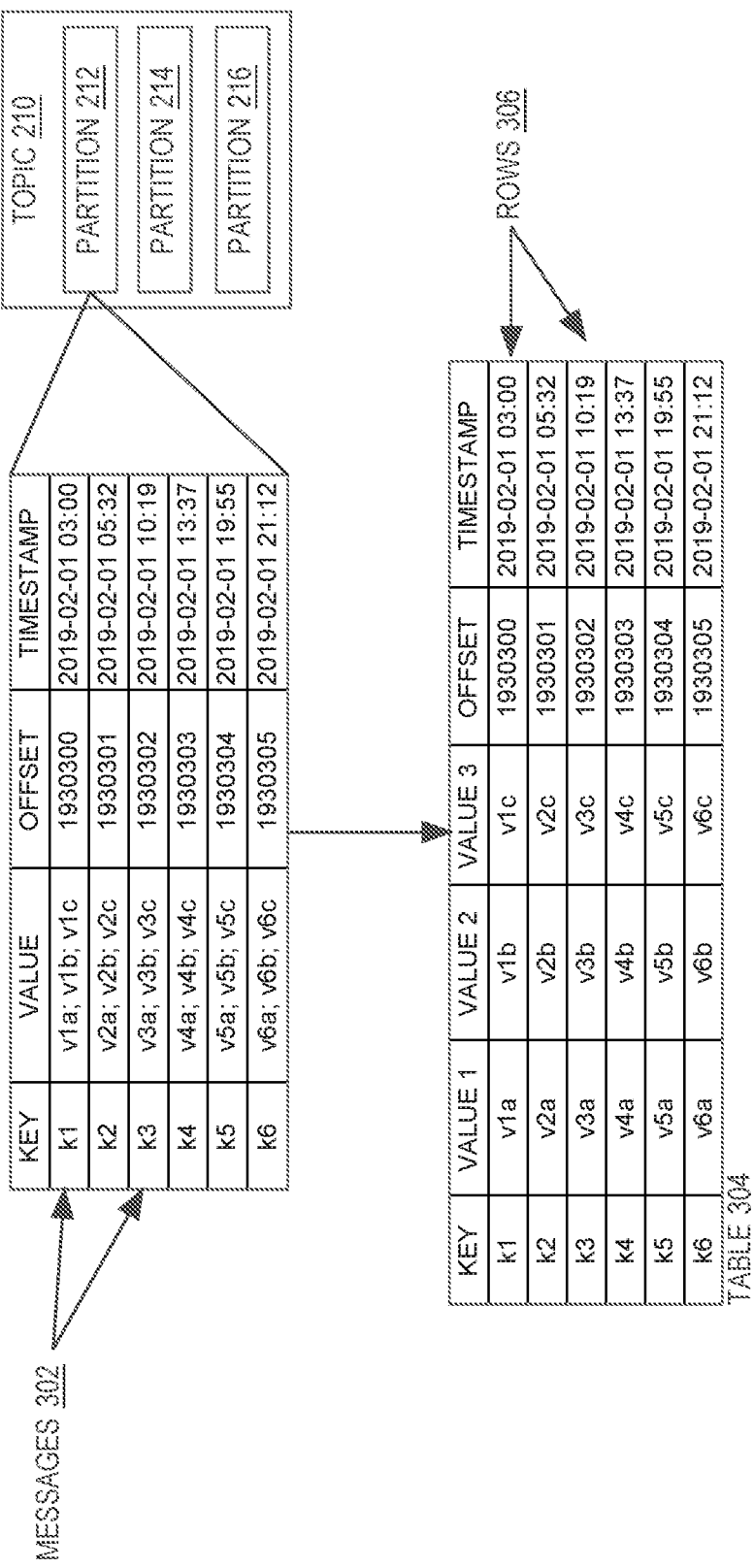
FIG. 3 depicts an example data stream mapped to an external table.

FIG. 3 illustrates an example external table that is mapped to a partition of a topic. For the purpose of illustrating a clear example, assume each message in topic 210 includes a message key and a message value. Each message value comprises a set of three, comma-delineated values. Additionally, each message is associated with a partition offset and a message timestamp.

The external table is defined with six columns that correspond to the format and structure of the messages, such as messages 302, in topic 210. A "Key" column corresponds to the message key. The "Value 1," "Value 2," and "Value 3" columns correspond to the three comma-delineated values in the message value. Additionally, an "Offset" column corresponds to the offset of each message and a "Timestamp" column corresponds to the timestamp of each message. The database system may receive the messages 302 from partition 212, parse and transform the messages, and generate the corresponding rows 306 of external table 304.

In an embodiment, the database system defines the external table in response to receiving one or more database statements describing the external table. The one or more database statements may specify a particular topic and/or one or more particular partitions of the topic. The database statements may also define one or more columns of the external table. Additionally, the one or more database statements may include one or more access parameters that indicate how to retrieve messages from a cluster, topic, or partition and how to parse the messages.

For example, the access parameters may include uniform resource locators (URLs) that identify all of the message brokers that a client application would need for accessing a particular Kafka cluster, including a topic name, the one or more partitions being accessed, and any required credentials needed by a client application to authenticate to the Kafka cluster.

As another example, the access parameters may describe the expected shape of messages in the topic and/or how message contents correspond to the one or more columns of the external table. The description may be used when reading messages from the partition(s) to transform the messages into rows of the external table.

In an embodiment, to assist applications, external tables may also be used to connect to a Kafka cluster and return metadata describing the cluster and/or the state of the cluster. For example, metadata may identify existing topics in the cluster and the state of partitions in the cluster, such as offsets for each partition. Thus, information regarding data streams may be processed by the database system using, for example, standard database query language semantics such as structured query language (SQL) and database application logic such as ODBC applications and stored procedures, and such.

In an embodiment, the database system manages and stores offset information for one or more partitions. The offset information may be stored, for example, in an external table that stores metadata for the cluster, in a column of an external table for reading data from the one or more partitions, and/or separate from any external tables, e.g. in metadata in the database dictionary.

Managing and storing offset information using the database allows a database application to manage tracking of the offsets rather than delegating offset management to the data stream platform. As described in further detail below, a database application may call functions to retrieve the current offset before executing a query, and to update the offset after reading the data and executing the query.

In an embodiment, analysis runs within the context of a database transaction. The database transaction may be used by a database application to encapsulate one or more database queries that join Kafka data with database table data. The database transaction may perform the analysis and store the results of the analysis to application-specific summary tables. The database transaction may also commit the offset by storing offset information to metadata tables or relational database tables in the database system.

A database transaction may include multiple queries that target external tables associated with the same topic and/or partition, e.g. multiple sequential accesses, or multiple queries that target external tables associated with different topics and/or partitions. The offset may be tracked and updated for each partition after each query, and the final offset(s) stored after the transaction is committed.

One benefit to this approach is that all of the analytics for a batch of external table rows will either be processed to completion or will be rolled back if there is a system failure. After a failure, the application may redo any uncommitted work that was lost based on the previous offset information. If Kafka manages offsets for applications, then when there is a system failure, after recovery, Kafka can potentially give an application rows that the application has already processed, or lose rows that the application should have processed. For example, Kafka may provide a set of messages to an application, and the application successfully processes the set of messages, but then Kafka fails before updating the offset. Since Kafka did not update the offset, it will include messages that were previously provided to the application at the next request. As another example, Kafka may provide a set of messages to the application and update the offset, but the application fails and does not process all of the messages. Since Kafka has already updated the offset, the messages that were not successfully processed will not be resent to the application at the next request. Using the techniques described herein, the offsets are managed within a standard ACID transaction context of the database application, which eliminates these failure scenarios.

This eliminates the problems encountered when Kafka tracks offsets, where the offset is updated even if processing of a batch of messages failed.

Figure 4:
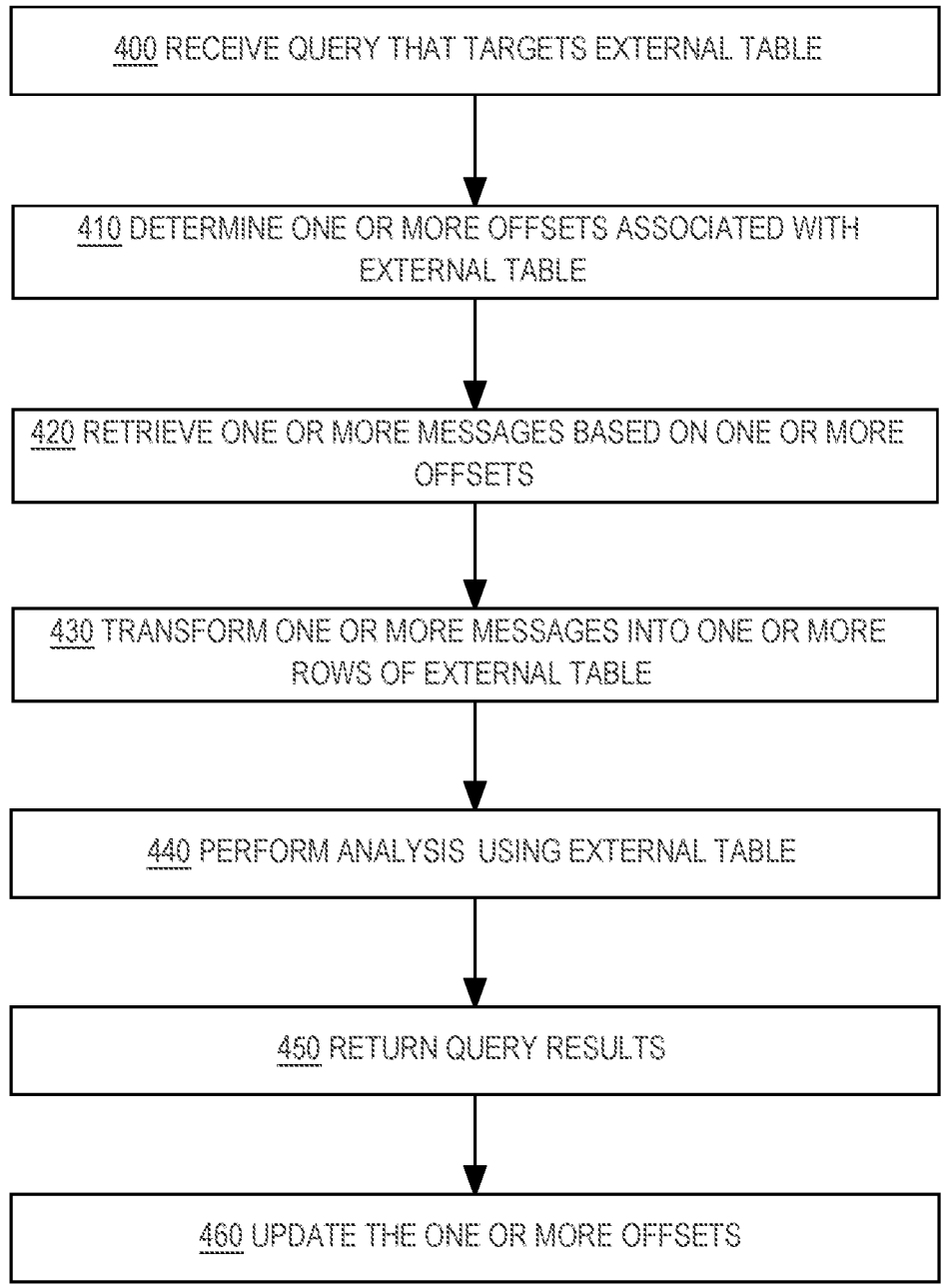
FIG. 4 depicts an example approach for executing a query that references an external data stream.

FIG. 4 illustrates an example process for executing a query that specifies an external table. At step 400, the database system receives a query that targets an external table. The database system may receive the query from a database application for processing the external data. For example, the database application may belong to a particular group, and each database application instance of the group exclusively joins database tables against a respective external table. Each respective external table is dedicated to a respective partition in a topic. Each application instance may therefore be responsible for analyzing messages that are assigned to the respective partition.

At step 410, one or more offsets associated with the external table are determined. The one or more offsets indicate a position within a respective external data stream, or portion thereof, for retrieving data. For example, the data source for the external table may be one or more Kafka partitions within a Kafka topic, and each offset may indicate a position within a respective partition.

In response to receiving the query, the database system executes the query. In an embodiment, executing the query includes retrieving one or more messages from the external data stream and transforming the one or more messages into one or more rows of the external table. The one or more rows of the external table may be joined with one or more relational database tables of the database system, processed, and/or analyzed based on the query. Additionally, the results generated by executing the query may be stored in one or more database tables.

At step 420, the database system retrieves one or more messages from the external data stream. The one or more messages may be retrieved based on the access parameters defined for the external table. The access parameters may specify, for example, one or more target partitions.

In an embodiment, each access to the external table visits one or more particular partitions associated with the external table, and acquires a specified number of messages from the one or more particular partitions, e.g. 1000 messages, and/or messages within a particular time frame. Thus, similar to a Kafka application, each access to the external table reads a fixed number of messages.

In some embodiments, rather than reading a set of messages based on their original timestamps, the external table may be configured to read a set of messages in the one or more partitions based on offsets, i.e. discrete integer positions.

For example, if an external table maps to a single partition in a topic, random access operators can be used to seek to arbitrary offsets and read various window sizes of messages. That is, rather than reading a fixed number of messages from the latest position that was read in the mapped partition, the external table may navigate to an arbitrary position in the partition and read an arbitrary number of messages. An example random access operator may be:

seekToOffset("partition_1", 1930300, 10000)

where the seekToOffset( ) operator targets a partition, "partition_1," starting at the offset position "1930300," and reading a window size of 100000 messages.

One benefit of reading a specified number of messages each time, as opposed to bounding queries by timestamps, is that reliability may be improved by guaranteeing limits to the consumption of stream processing resources instead of being vulnerable to unexpected volume spikes. This permits an external table to sequentially access data residing in each partition, which may reduce memory consumption by limiting the amount of data loaded into the external table each time. In some embodiments, if the window size is set to zero, all messages in a partition starting from the offset will be read.

At step 430, each retrieved message is transformed into a row of the external table. In an embodiment, data loading in the database system may be performed using an external table pre-processor. The external table pre-processor may retrieve messages from a Kafka system by calling off-the-shelf Kafka client software or by using a Kafka protocol to interact with the Kafka system at a message protocol layer.

In an embodiment, on each invocation, such as for the query, the external table pre-processor may determine the next offset value and the size of the batch (i.e. number of rows) to fetch from the Kafka partition. The external table pre-processor may then connect to Kafka, fetch messages starting at the specified offset value, and feed the output to an ETL mechanism, which renders the data as a set of rows in the external table.

At step 440, query analysis is performed using the rows of the external table. For example, the rows of the external table may be joined with rows of standard, transactional database tables of the database system, or otherwise processed, filtered, and/or analyzed as specified by the query.

At step 450, the results of the query are returned to the requesting application. Additionally or alternatively, the results of the query may be stored in a relational database table of the database system, such as a summary or results table. The stored results may be used by the database system in subsequent queries. In some embodiments, in contrast, the data in the external table is not stored persistently for use in subsequent queries.

At step 460, the database system updates and stores the one or more offsets based on the previous offsets and the number of messages read from the data stream. An updated offset may indicate the position, within a corresponding partition, of the last message that was read from the partition. In some embodiments, if the offset was used in conjunction with a random access operator, then the offset may not be updated at step 460.

As discussed above, an external table can map to one, many, or all partitions of a topic. This flexibility means that if an application does some aggregates and analysis of limited complexity using SQL, the application can use just a single external table to consume all partitions in the topic. However, if the application does intense CPU bound analytics after it retrieves data from SQL, multiple external tables may be used instead, where each external table is mapped to one partition, or a small number of partitions, belonging to the same topic. This allows multiple application instances to run concurrently, where each application instance exclusively consumes one external table, which is in turn mapped to one or more partitions. In this way, processing of messages in a topic may be performed by the multiple application instances in parallel. Thus, the database system may support Kafka's model of horizontal scaling at an application level in order to achieve a divide and conquer processing model for SQL.

Another benefit of the techniques described herein is that analysis resides at or near the top of a software stack, such as in a query execution engine of an RDBMS, stored procedures, and/or an ODBC client, which provide data abstraction and manipulation capabilities (e.g. using data manipulation language DML) such as projection and rich expressions for filtration, joins, aggregation (e.g. group by), sorting, and data statistics. Thus, the database system does not need Kafka itself to natively or directly support data analysis. As such, Kafka's dataflow streamlining is ideally suited for this model. In contrast, data stream processing platforms that provide better support for complex event processing (CEP) at the expense of higher latency may be counterproductive because they do not adequately separate the data collection, tracking, and computational responsibilities compared to the techniques described herein. For example, if a processing platform provides complex processing capabilities, requests for the data may take longer to process due to delays caused by said processing. As another example, if a processing platform uses database data in processing messages, then the platform would need to issue queries to a database system or cache database data, the drawbacks of which were discussed in the Background section above.

DBMS Overview

A database management system (DBMS) manages one or more databases. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMS's, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database, as well as other kinds of operations. A database command may be in the form of a database statement that conforms to a database language. A database language for expressing the database commands is the Structured Query Language (SQL). There are many different versions of SQL, some versions are standard and some proprietary, and there are a variety of extensions. Data definition language commands are issued to a database server to create or configure database objects, such as tables, views, or complex data types. DDL commands are used to configure a database server for a particular hardware environment, to configure computer resource usage of the database server, as well as other operating aspects of the database server.

A multi-node database management system is made up of interconnected nodes that share access to the same database or databases. Typically, the nodes are database server hosts interconnected via a network and share access, in varying degrees, to shared storage, e.g. shared access to a set of disk drives and data blocks stored thereon. Each node in a multi-node database system hosts a database server. A server, such as a database server, is a combination of software and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to as a "server instance" or "instance." A database server may comprise multiple database instances, some or all of which are running on separate computers, including separate server blades.

Changes to a database in a DBMS are made using transaction processing. A database transaction is a set of operations that change database data. In a DBMS, a database transaction is initiated in response to database statement (e.g. query) requesting a change, such as DML statement requesting as an update, insert of a row, or a delete of a row. Committing a transaction refers to making the changes for a transaction permanent.

Under transaction processing, all the changes for a transaction are made atomically. When a transaction is committed, either all changes are committed, or the transaction is rolled back. DML statements or commands refer to statements that specify to change data, such as INSERT and UPDATE statement. A DML statement or command also refers to statement that merely queries database data.

The term process refers to a computer system process, which is described below in the HARDWARE OVERVIEW. Processes that comprise a database server run under the control of the database server (i.e. can be created or terminated by the database server) and perform various database server functions. Such processes are referred to herein as database server processes. Database server processors include listeners, garbage collectors, log writers, "server processes" for database sessions for executing database commands issued by database clients (including processes executing within shared sessions), and recovery processes.

Software Overview

Figure 5:
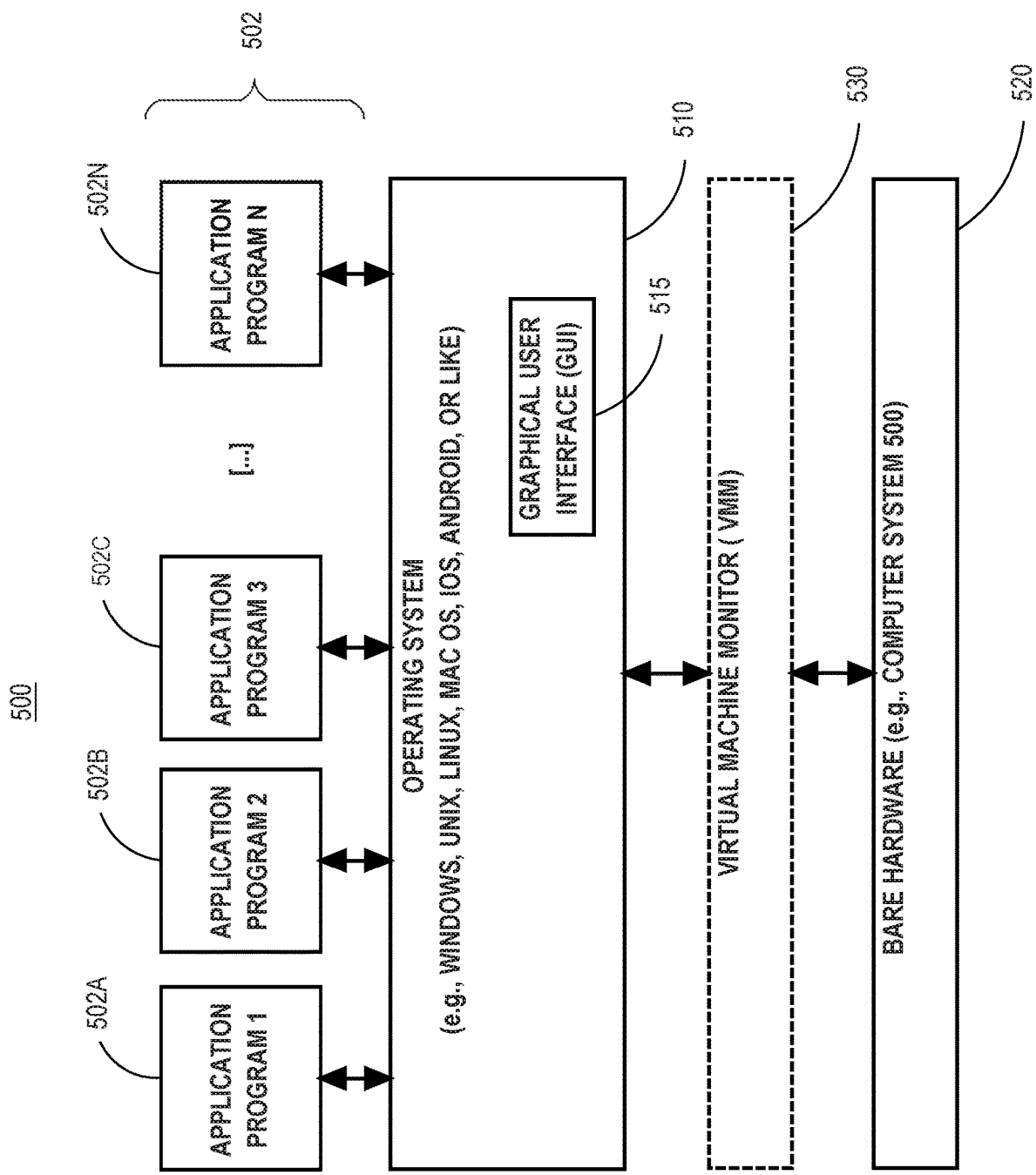
FIG. 5 depicts a computer system upon which embodiments may be implemented.

FIG. 5 illustrates an example software system 500. Software system 500 may be employed for controlling the operation of computing system 600. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 600. Software system 500, which may be stored in system memory (RAM) 606 and on fixed storage (e.g., hard disk or flash memory) 610, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 610 into memory 606) for execution by the system 500. The applications or other software intended for use on computer system 600 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 604) of computer system 600. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 600.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 500 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications; Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment); Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer); and Database as a Service (DBaaS) in which consumers use a database server or Database Management System that is running upon a cloud infrastructure, while a DbaaS provider manages or controls the underlying cloud infrastructure and applications.

Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 6:
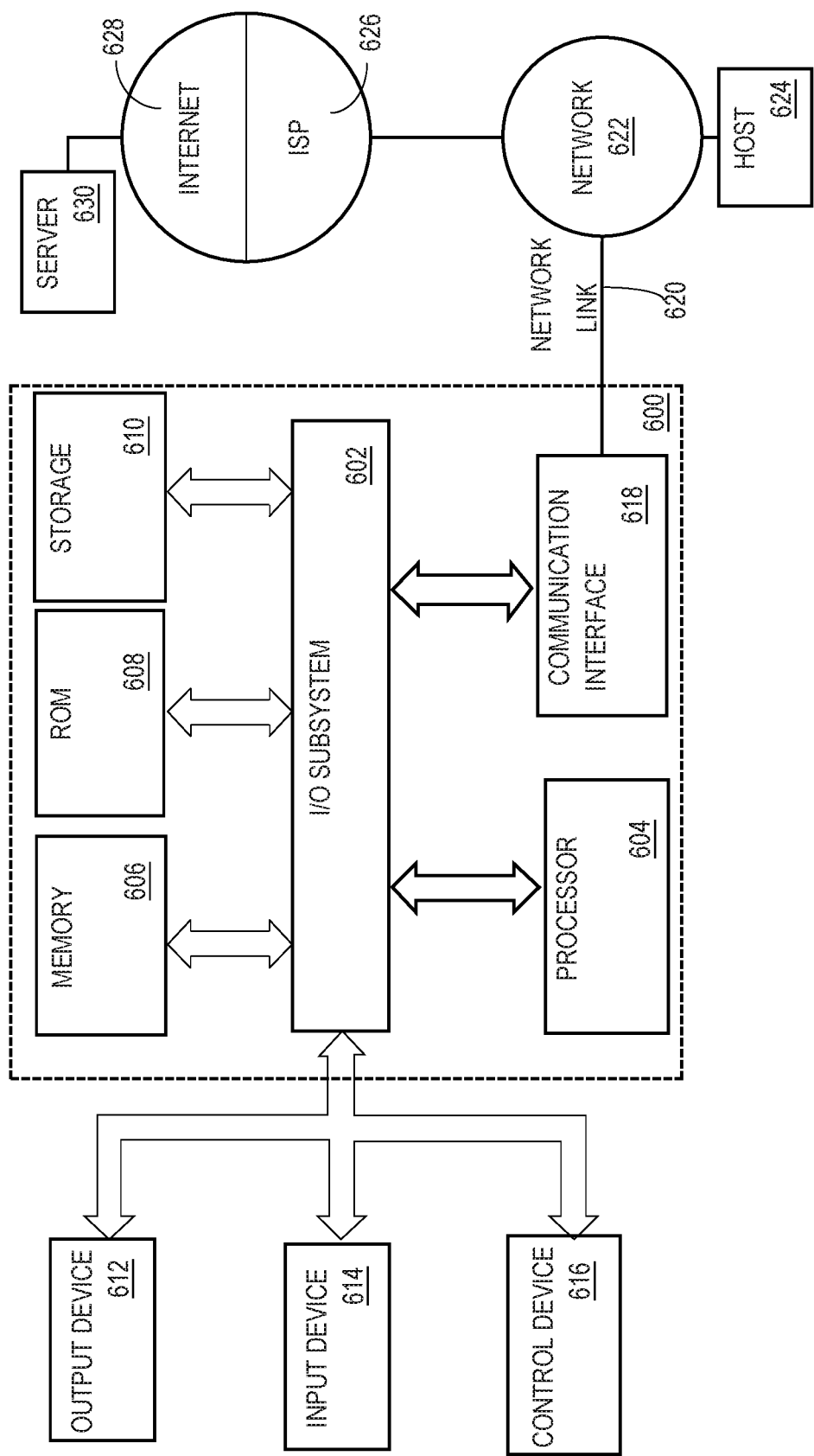
FIG. 6 depicts a software system for controlling operation of the computer system.

FIG. 6 is a block diagram that illustrates an example computer system with which an embodiment may be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus and/or other communication mechanism(s) for communicating information and/or instructions between the components of the computer system 600 over electronic signal paths. The I/O subsystem 602 may include an I/O controller, a memory controller and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system or a graphics processing unit (GPU) or a digital signal processor or ARM processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory 606 may include volatile memory such as various forms of random-access memory (RAM) or other dynamic storage device. Memory 606 also may be used for storing temporary variables or other intermediate information during execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read only memory (ROM) 608 or other static storage device coupled to I/O subsystem 602 for storing information and instructions for processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, or solid-state storage, magnetic disk or optical disk such as CD-ROM or DVD-ROM, and may be coupled to I/O subsystem 602 for storing information and instructions. Storage 610 is an example of a non-transitory computer-readable medium that may be used to store instructions and data which when executed by the processor 604 cause performing computer-implemented methods to execute the techniques herein.

The instructions in memory 606, ROM 608 or storage 610 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 600 may be coupled via I/O subsystem 602 to at least one output device 612. In one embodiment, output device 612 is a digital computer display. Examples of a display that may be used in various embodiments include a touch screen display or a light-emitting diode (LED) display or a liquid crystal display (LCD) or an e-paper display. Computer system 600 may include other type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators or servos.

At least one input device 614 is coupled to I/O subsystem 602 for communicating signals, data, command selections or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on display 612. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 614 may include a combination of multiple different input devices, such as a video camera and a depth sensor.

In another embodiment, computer system 600 may comprise an internet of things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware and interfaces for generating position reporting packets, notifications, pulse or heartbeat signals, or other recurring data transmissions that specify a position of the computer system 600, alone or in combination with other application-specific data, directed toward host 624 or server 630.

Computer system 600 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to a format that can be read by computer system 600. For instance, a receiver such as a radio frequency antenna or an infrared detector can receive the data carried in a wireless or optical signal and appropriate circuitry can provide the data to I/O subsystem 602 such as place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to bus 602. Communication interface 618 provides a two-way data communication coupling to network link(s) 620 that are directly or indirectly connected to at least one communication networks, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 622 broadly represents a local area network (LAN), wide-area network (WAN), campus network, internetwork or any combination thereof. Communication interface 618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through a network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a world-wide packet data communication network represented as internet 628. A server computer 630 may be coupled to internet 628. Server 630 broadly represents any computer, data center, virtual machine or virtual computing instance with or without a hypervisor, or computer executing a containerized program system such as DOCKER or KUBERNETES. Server 630 may represent an electronic digital service that is implemented using more than one computer or instance and that is accessed and used by transmitting web services requests, uniform resource locator (URL) strings with parameters in HTTP payloads, API calls, app services calls, or other service calls. Computer system 600 and server 630 may form elements of a distributed computing system that includes other computers, a processing cluster, server farm or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 630 may comprise a web application server that hosts a presentation layer, application layer and data storage layer such as a relational database system using structured query language (SQL) or no SQL, an object store, a graph database, a flat file system or other data storage.

Computer system 600 can send messages and receive data and instructions, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage 610, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   at a database management system, receiving a query that returns results that are based on one or more rows from an external table;
   wherein a database dictionary defines one or more columns for the external table and a data source for said external table that comprises an external message stream;
   wherein a message stream offset points to a position within said external message stream;
   in response to receiving said query that returns the results that are based on the one or more rows from the external table, executing the query, wherein executing the query comprises:
   a) generating the one or more rows from said external table, each row of said one or more rows corresponding to a respective message in said external message stream retrieved from said external message stream after said message stream offset;
   wherein generating one or more rows comprises, for each row of said one or more rows, accessing said external message stream to generate column values for said each row; and
   b) returning the results that are based on the one or more rows from the external table.

2. The method of claim 1, wherein the message stream offset points to a position of a furthest message retrieved from said external message stream.

3. The method of claim 2 further comprising:
   storing, at the database management system, the message stream offset;
   after executing the query, updating the message stream offset to reflect messages retrieved for said one or more rows.

4. The method of claim 3, wherein receiving a query includes receiving a query within a database transaction, and wherein said database transaction includes said updating the message stream offset.

5. The method of claim 4, further comprising:
   receiving a second query to execute within the database transaction, wherein the second query targets the external table;
   in response to receiving said second query, executing the second query, wherein executing the second query comprises:
   generating one or more additional rows from said external table, each row corresponding to a message in said external message stream retrieved from said external message stream after said updated message stream offset.

6. The method of claim 4, further comprising:
   receiving a second query to execute within the database transaction, wherein the second query targets a second external table;
   wherein a second message stream offset points to a position within a second external message stream;
   in response to receiving said second query, executing the second query, wherein executing the second query comprises:
   generating one or more rows from said second external table, each row corresponding to a message in said second external message stream retrieved from said second external message stream after said second message stream offset;
   after executing the query, updating the second message stream offset to reflect messages retrieved for said one or more rows from said second external table.

7. The method of claim 1, wherein the external table does not persistently store data.

8. The method of claim 7, wherein the message stream offset points to a position of a particular message of said external message stream.

9. The method of claim 1, wherein executing the query further comprises joining the one or more rows from said external table with rows of one or more database tables stored in a database managed by said database management system.

10. The method of claim 1, wherein one or more particular columns for the external table corresponds to a message value of messages of said external message stream.

11. The method of claim 1, wherein one or more particular columns for the external table correspond to metadata that describe messages of said external message stream.

12. The method of claim 1, wherein the external message stream comprises a plurality of partitions, and the data source for said external table specifies one or more particular partitions of the plurality of partitions.

13. A non-transitory computer-readable medium storing instructions which, when executed by one or more processors, cause:
   at a database management system, receiving a query that returns results that are based on one or more rows from an external table;
   wherein a database dictionary defines one or more columns for the external table and a data source for said external table that comprises an external message stream;
   wherein a message stream offset points to a position within said external message stream;
   in response to receiving said query that returns the results that are based on the one or more rows from the external table, executing the query, wherein executing the query comprises:
   a) generating the one or more rows from said external table, each row of said one or more rows corresponding to a respective message in said external message stream retrieved from said external message stream after said message stream offset;
   wherein generating one or more rows comprises, for each row of said one or more rows, accessing said external message stream to generate column values for said each row; and b) returning the results that are based on the one or more rows from the external table.

14. The non-transitory computer-readable medium of claim 13, wherein the message stream offset points to a position of a furthest message retrieved from said external message stream.

15. The non-transitory computer-readable medium of claim 14 wherein the instructions, when executed by the one or more processors, further cause:
   storing, at the database management system, the message stream offset;
   after executing the query, updating the message stream offset to reflect messages retrieved for said one or more rows.

16. The non-transitory computer-readable medium of claim 15, wherein receiving a query includes receiving a query within a database transaction, and wherein said database transaction includes said updating the message stream offset.

17. The non-transitory computer-readable medium of claim 16 wherein the instructions, when executed by the one or more processors, further cause:
   receiving a second query to execute within the database transaction, wherein the second query targets the external table;
   in response to receiving said second query, executing the second query, wherein executing the second query comprises:
   generating one or more additional rows from said external table, each row corresponding to a message in said external message stream retrieved from said external message stream after said updated message stream offset.

18. The non-transitory computer-readable medium of claim 16 wherein the instructions, when executed by the one or more processors, further cause:
   receiving a second query to execute within the database transaction, wherein the second query targets a second external table;
   wherein a second message stream offset points to a position within a second external message stream;
   in response to receiving said second query, executing the second query, wherein executing the second query comprises:
   generating one or more rows from said second external table, each row corresponding to a message in said second external message stream retrieved from said second external message stream after said second message stream offset;
   after executing the query, updating the second message stream offset to reflect messages retrieved for said one or more rows from said second external table.

19. The non-transitory computer-readable medium of claim 13, wherein the message stream offset points to a position of a particular message of said external message stream, and wherein the query specifies the message stream offset.

20. The non-transitory computer-readable medium of claim 13, wherein executing the query further comprises joining the one or more rows from said external table with rows of one or more database tables stored in a database managed by said database management system.

21. The non-transitory computer-readable medium of claim 13, wherein one or more particular columns for the external table corresponds to a message value of messages of said external message stream.

22. The non-transitory computer-readable medium of claim 13, wherein one or more particular columns for the external table correspond to metadata that describe messages of said external message stream.

23. The non-transitory computer-readable medium of claim 13, wherein the external message stream comprises a plurality of partitions, and the data source for said external table specifies one or more particular partitions of the plurality of partitions.

* * * * *